United States Patent
Kim

(10) Patent No.: US 7,356,356 B2
(45) Date of Patent: Apr. 8, 2008

(54) TELEPHONE NUMBER RETRIEVAL SYSTEM AND METHOD

(75) Inventor: Chan-Woo Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 572 days.

(21) Appl. No.: 10/976,520

(22) Filed: Oct. 29, 2004

(65) Prior Publication Data

US 2005/0094782 A1 May 5, 2005

(30) Foreign Application Priority Data

Oct. 29, 2003 (KR) ...................... 10-2003-0076089

(51) Int. Cl.
*H04B 1/38* (2006.01)
*H04M 1/64* (2006.01)

(52) U.S. Cl. .................. 455/563; 455/566; 379/88.01; 379/88.04

(58) Field of Classification Search ................ 455/563, 455/566; 379/88.01, 88.04
See application file for complete search history.

(56) References Cited

U.S. PATENT DOCUMENTS

| | | | |
|---|---|---|---|
| 6,157,848 A | 12/2000 | Bareis et al. | ............... 455/563 |
| 6,522,725 B2 * | 2/2003 | Kato | ........................ 379/88.01 |
| 6,570,964 B1 | 5/2003 | Murveit et al. | |
| 6,868,267 B1 * | 3/2005 | Briggs et al. | ............... 455/406 |
| 7,174,191 B2 * | 2/2007 | Doble | ........................ 455/563 |
| 2002/0097848 A1 * | 7/2002 | Wesemann et al. | ...... 379/88.18 |
| 2003/0091164 A1 * | 5/2003 | Maruyama | ................ 379/88.01 |
| 2005/0216273 A1 * | 9/2005 | Reding et al. | ............... 704/275 |
| 2007/0094032 A1 * | 4/2007 | Bennett et al. | .......... 704/270.1 |

FOREIGN PATENT DOCUMENTS

| | | |
|---|---|---|
| EP | 1119158 | 7/2001 |
| JP | 10084419 A | 3/1998 |
| JP | 11-252283 | 9/1999 |
| JP | 2002300306 A | 10/2002 |
| KR | 000002586 A | 1/2000 |
| KR | 000003371 A | 1/2000 |
| KR | 010008179 A | 2/2001 |
| KR | 1020020065229 A | 8/2002 |

* cited by examiner

*Primary Examiner*—Barry Taylor
(74) *Attorney, Agent, or Firm*—Lee, Hong, Degerman, Kang & Schmadeka

(57) ABSTRACT

Methods and systems directed to telephone number retrieval are provided. A terminal requests a telephone number from a telephone number service. A voice response comprising the telephone number is received from the telephone number service. A feature vector sequence is stored in memory of the terminal as a reference pattern for the received voice response. The voice response has designated words between and among numbers of the telephone number. A keyword spotting routine searches for the designated words. Connecting words, located between and among designated words, comprising the telephone number are extracted and stored in a buffer. A number recognizer analyzes contents of the buffer. The number recognizer outputs a recognized telephone number for display on a terminal and/or storage in memory for future use.

34 Claims, 5 Drawing Sheets

TELEPHONE NUMBER RETRIEVAL SYSTEM AND METHOD

CROSS-REFERENCE TO RELATED APPLICATIONS

Pursuant to 35 U.S.C. § 119(a), this application claims the benefit of earlier filing date and right of priority to Korean Application No. 10-2003-0076089, filed on Oct. 29, 2003, the contents of which are hereby incorporated by reference herein in their entirety.

BACKGROUND OF THE INVENTION

1. Field of the Invention

The present invention relates to displaying and storing a telephone number. More particularly, the invention relates to a telephone number retrieval system for displaying and storing a telephone number from a telephone number service.

2. Description of the Related Art

If a user doesn't know a telephone number, the user calls a telephone number service for assistance. An operator of the telephone number service receives a telephone number request from the user, for example, a business or department store. A search for the telephone number is performed. The telephone number service provides the telephone number to the user through an automatic response service (ARS). A user writes down or memorizes the telephone number provided, for example, by a mechanical voice of the ARS. The user calls the telephone number, for example, through the automatic link function, which dials the telephone number based on a user's instructions.

If the user is unable to understand the mechanical voice of the ARS due to, for example, noise, the user is required to again contact the telephone number service. This inconvenience results in a loss of time and may result in paying one or more additional fees to access the telephone number service. If a user does not want to use the automatic link service, the user is required to note the telephone number. A user who forgets or loses the telephone number has to again use the telephone number service, which results in loss of time and money to the user.

FIGS. 1 and 2, illustrate prior art examples of telephone number services that automatically dial a telephone number requested by a user. In one prior art example, a conventional neural network algorithm receives and learns the mechanical voice of the ARS. Conventional neural network algorithms have difficulty distinguishing the voice of a telephone operator from the mechanical voice of the ARS. A conventional telephone number service uses mechanical voice recognition algorithms, such as Hidden Markov Model (HMM) or a neural circuit, which are dependent on the speaker's voice. The preset mechanical voice of an ARS using Hidden Markov Model (HMM) or a neural circuit network provide low efficiency and poor performance determining accurately the telephone number.

Isolated word recognition algorithms have difficulty distinguishing words spoken by the ARS from a target telephone number and/or other information. If the voice type or the automatic response type is changed, the conventional voice recognition algorithms cannot efficiently adapt to these changes to accurately receive the desired telephone number.

Thus, there is a need for a telephone number retrieval system that provides improvements over the prior art systems such as improved recognition of the telephone number even under noisy environmental conditions as well as provides other advantages such as an ability to store the telephone number if a user desires to call at a later time.

SUMMARY OF THE INVENTION

The present invention is a telephone number retrieval system. The telephone number retrieval system disclosed herein displays and/or stores a telephone number from a telephone number service. The system provides a solution to problems associated with conventional telephone number retrieval systems such as recognizing a telephone number under noisy conditions, updating capability when a voice type or response changes of the response system, and storing the telephone number until a user desires to call.

In accordance with one embodiment, the telephone number retrieval system contacts a telephone number service such as an automatic response service (ARS). The automatic response service, for example, uses a reference vector sequence. The reference vector sequence specifies a format wherein designated words or phrases are added before and after digits of the telephone number from the automatic response service. The designated words are recognized by a keyword spotting routine. The numbers connecting the designated words are extracted and processed to create a recognized telephone number.

In one embodiment, the voice signal connected between the designated words are stored in a buffer. Contents of the buffer drive a number recognizer. The number recognizer processes the contents and outputs a recognized telephone number of the telephone number service. The recognized telephone number is displayed at the terminal and/or stored in memory such as a buffer.

In another embodiment, Dynamic Time Warping (DTW) is used as the number recognizer. The DTW utilizes a digit sequence (such as from 0 to 9) to create a feature vector sequence. The feature vector sequence defines a vector reference pattern for determining the location of the numbers used to create the telephone number. In accordance with one alternative embodiment of the system, the feature vector sequence are defined in advance. In yet another embodiment of the system, the feature vector sequences are created using Mel-Frequency Cepstral Coefficients (MFCC), Linear Predictive Cepstral Coefficients (LPCC) or Perceptual Linear Prediction (PLP). In yet another alternative embodiment of the system, the feature vectors are adapted to the particular format of the telephone number service.

In another embodiment, Hidden Markov Model (HMM), Vector Quantization (VQ), or Neural Network (NN), in addition to the DTW may be utilized for recognizing the connected words when the ARS has a change in voice type or response type, an appropriate reference pattern for the feature vectors are re-downloaded and stored, for example.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawing, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments

DETAILED DESCRIPTION OF THE PREFERRED EMBODIMENTS

Figure 1:
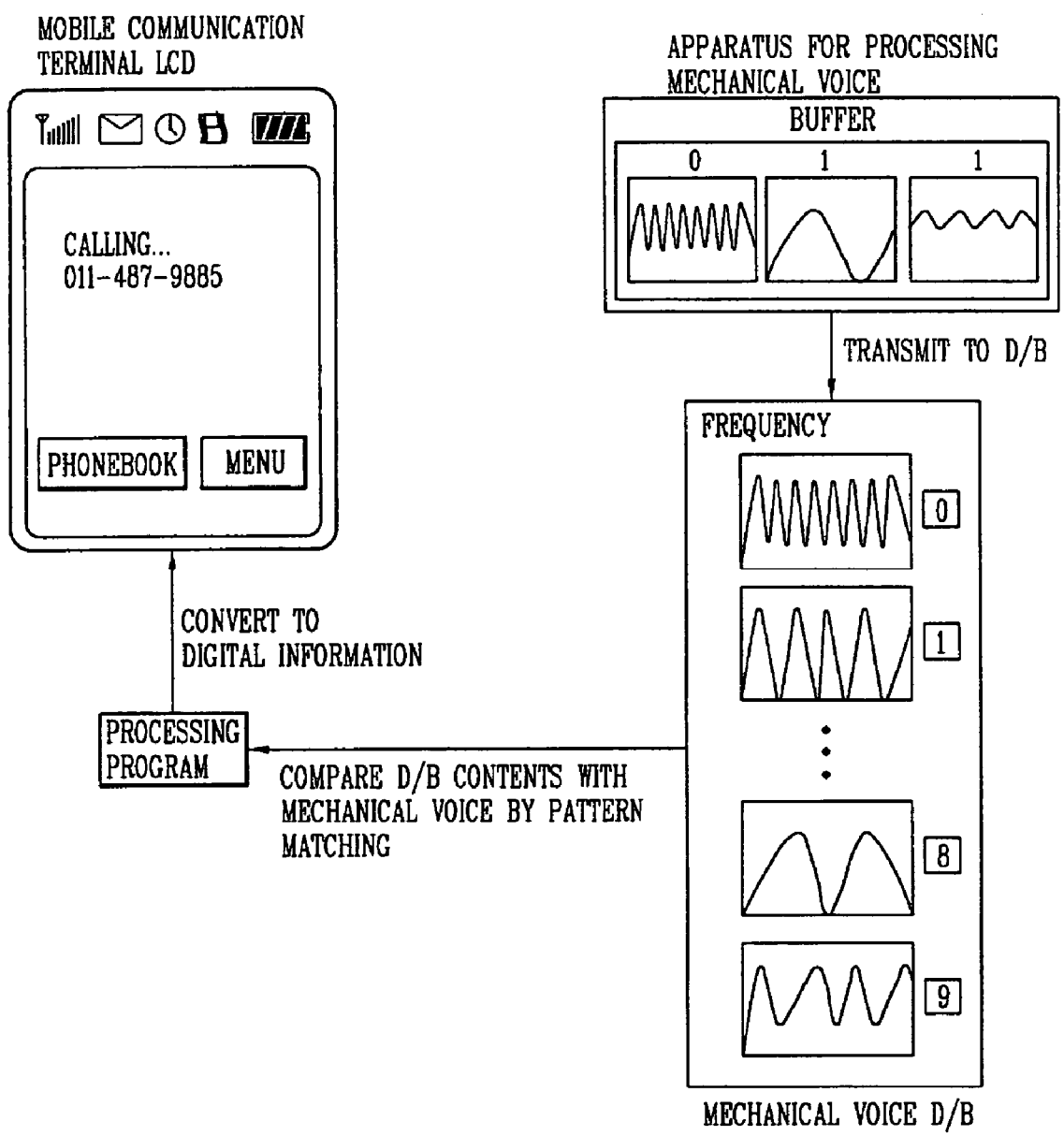
FIG. 1 is a structure view illustrating a prior art general apparatus for searching and automatically dialing a telephone number by a neural network algorithm.
Figure 2:
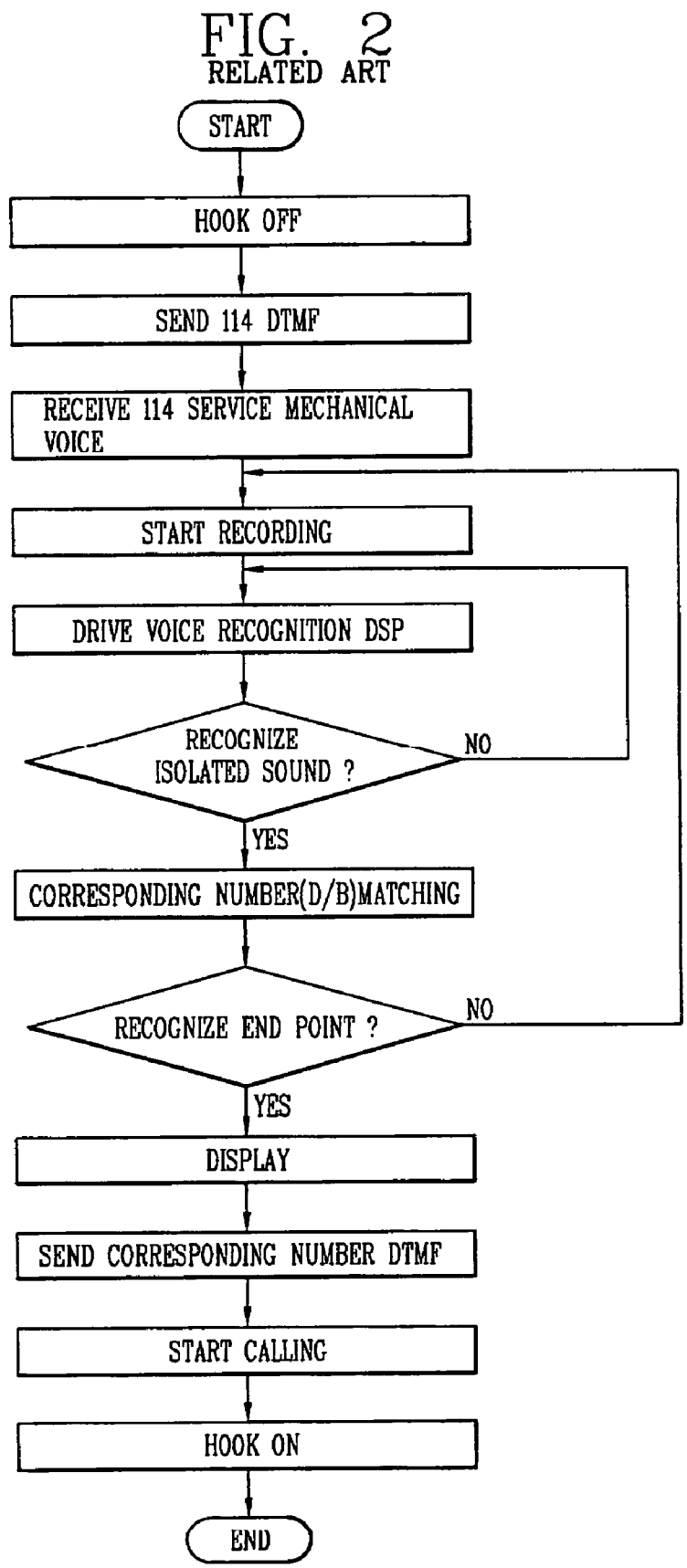
FIG. 2 is a flowchart illustrating prior art sequential steps of a general method for recognizing and automatically dialing a telephone number by speaker-dependent isolated word recognition algorithm.

The present invention relates to displaying and storing a telephone number from a telephone service. In particular, the present invention is a telephone number retrieval system and method for displaying and storing an automatic response telephone number on a mobile terminal from a voice or other response system, such as an Automatic Response System (ARS). The automatic response telephone number is displayed on the terminal for user substantially instantaneous use and/or stored in a phonebook of the terminal later for a user's use. This storage feature allows a user to selectively make a phone call.

The telephone number retrieval system provides a solution to problems associated with conventional response systems such as recognizing a telephone number under noisy conditions by providing a specified sequence. The telephone number retrieval system provides updating capability and versatility when a voice type or response changes by downloading a vector sequence of a telephone number service. The telephone number retrieval system has memory storage capacity for storing the telephone number until a user desires to call.

Although the telephone number retrieval system is illustrated with respect to a terminal, it is contemplated that the present invention may be applied to display and store a telephone number from a response system in any communication device. In the following detailed descriptions, well-known functions or constructions are not described in detail since they would obscure the invention in unnecessary detail.

A user accesses a mobile terminal desiring a telephone number from a telephone number service having a response system such as an automatic response system (ARS). The mobile terminal may be any mobile communication device such as a cell phone mobile, mobile phone, PDA or the like. In an alternative embodiment of the retrieval system, the terminal may be a base station terminal.

A reference feature vector sequence is prepared in advance, and stored in the memory during the production of the terminal. Designated words, which are words that are part of an automatic response including the telephone number, are stored in advance in memory of the terminal. The reference feature vector represents the format that the telephone number will be transmitted to a user.

A user calls a general telephone service from the terminal using a general informational number to obtain a telephone number. The telephone number service provides a telephone number to the user from an ARS in a formalized format. The format may be such as: "The number is xxx-xxxx. The number is xxx-xxxx. If you want your call directly connected, please press number one. You will be charged 100 won for your request". X represents a number from 0 to 9, for example.

In one example, the user requested by the user is 234-5678. The ARS provides a mechanical voice to the user through the mobile terminal speaker, such as, "The number is 234-5678. The number is 234-5678. If you want your call directly connected, please press number one. You will be charged 100 won for your request'.

The number retrieval system receives the telephone number as a received voice response such as a mechanical voice. The received voice response is searched by the number retrieval system for designated keywords, for example, unique to the telephone number service that is being accessed. The search is performed by a keyword spotting routine for connecting words between or among designated keywords. The keyword spotting routine extracts meaningful keywords from consecutive keywords, showing almost complete accuracy on the same voice of the same speaker like the ARS of the telephone number service. Therefore, the voice data corresponding to the numbers can be separated from voice of the ARS with almost complete accuracy.

Figure 3:
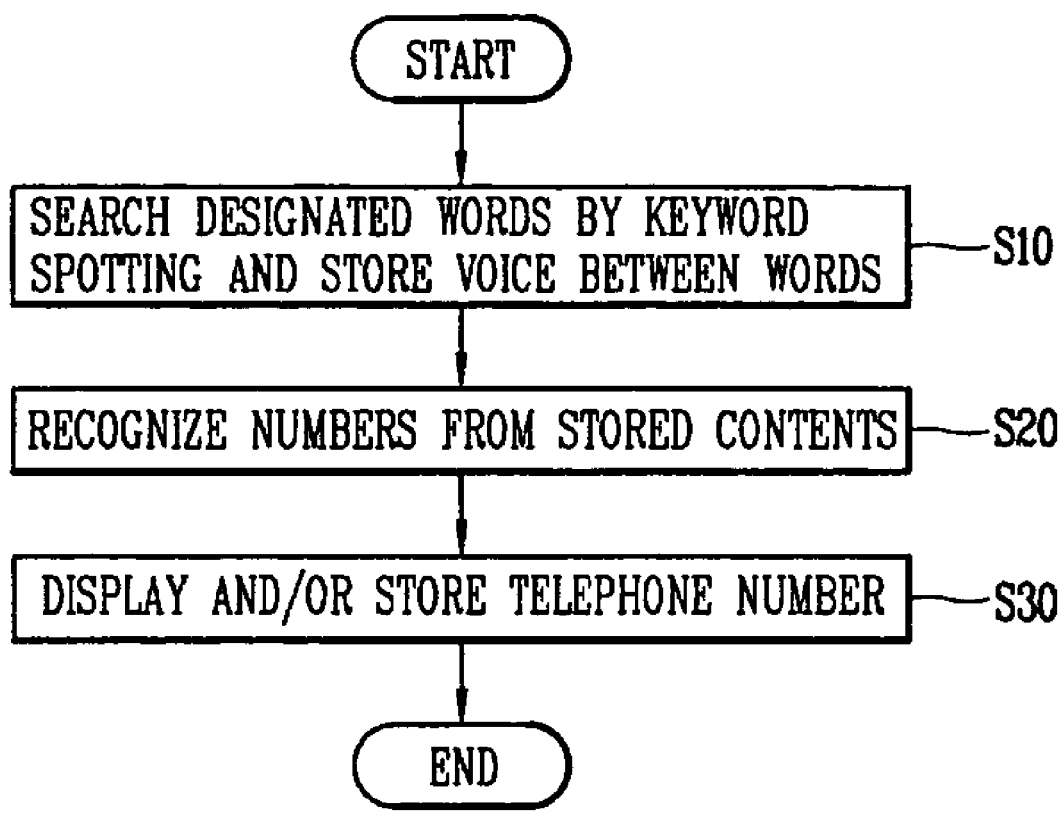
FIG. 3 is a flowchart illustrating a method for displaying and storing an automatic response telephone number in accordance with an embodiment of the invention.

Referring to FIG. 3, the connecting words, which represent numbers of the telephone number, are stored in a buffer (S10). A number recognizer processes contents in the buffer (S20) to recognize the telephone number. The recognized telephone number is displayed on a display, such as a LCD, or stored in memory (S30).

If the response type of the ARS is changed, updating the contents of the telephone retrieval system is necessary to accurately recognize telephone number. For example, if a voice type or a response type of the telephone number service (such as ARS) is changed, the software of the terminal needs to be upgraded. The update can occur by downloading a reference pattern, a feature vector sequence or a parameter file from the internet thorough a wired and/or wireless internet access connection. In one embodiment, the telephone number service having a format change and a service provider informs the user how to download the changed contents, and charges a fee in the form of a business model.

Other features of the telephone retrieval system include voice pre-processing of the received signal. Voice pre-processing technology extracts the characteristics of the received voice response. Some examples of voice pre-processing techniques used include: Mel-Frequency Cepstral Coefficients (MFCC), Linear Predictive Cepstral Coefficients (LPCC) or Perceptual Linear Prediction (PLP).

In one example, a user calls a telephone number service, a voice response is received by the terminal of a user comprising 'The number is' is a designated keyword searched for in the keyword spotting routine. A reference vector sequence of numbers recognizes the connected words, which contain the telephone number, between the designated keywords. The numbers associated with the connected words are processed and displayed on the terminal for a user's use or stored in memory for future use.

Figure 4:
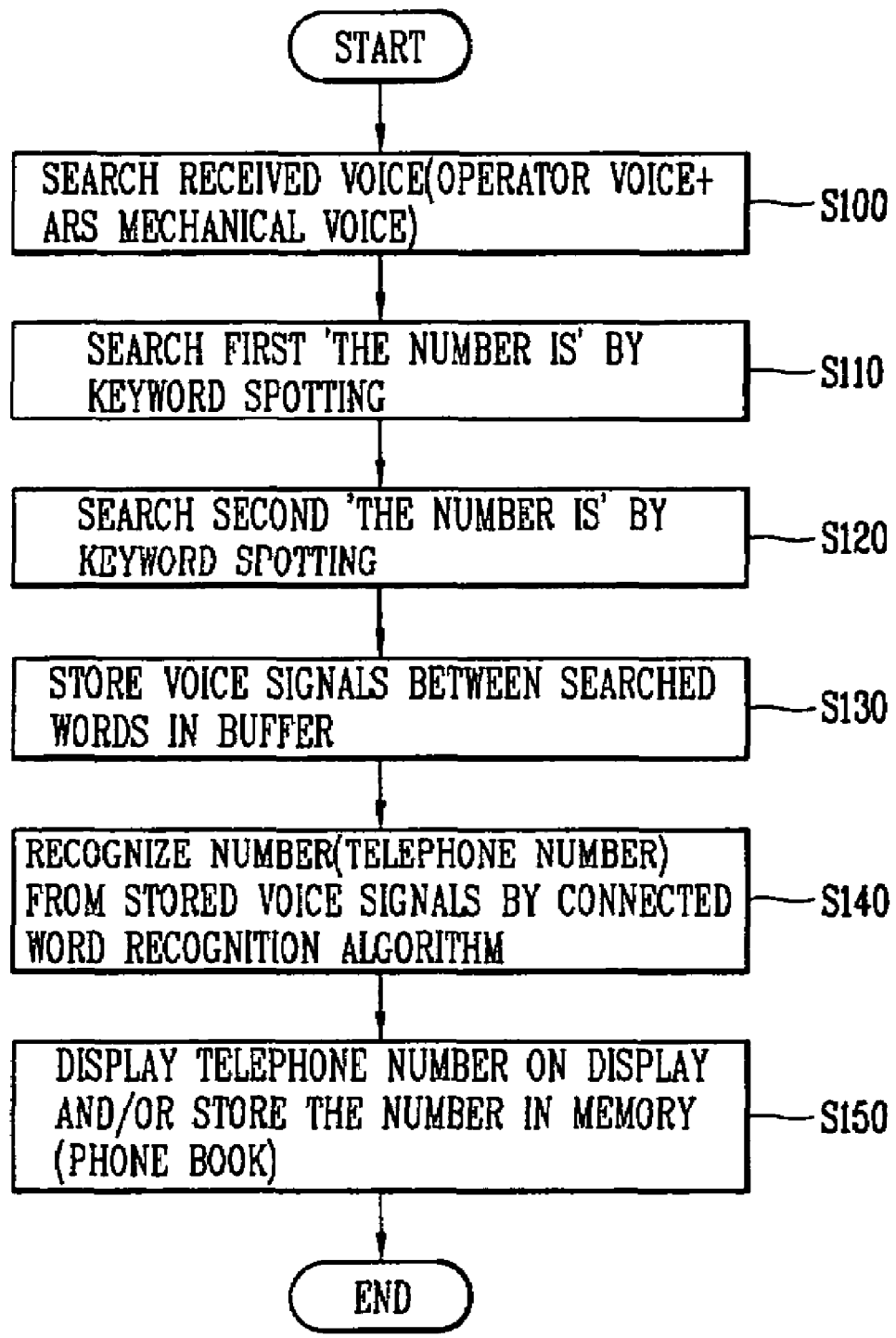
FIG. 4 is a flowchart illustrating sequential steps of the method for displaying and storing the automatic response telephone number in accordance with an embodiment of the invention.

Referring to FIG. 4, a user having the terminal, such as a portable terminal or a general wire telephone, calls the telephone number service, the received voice, namely, the voice of the telephone operator and the mechanical voice of the ARS are searched (S100). The terminal stores in its memory the reference feature vector sequence of 'The number is, 0, 1, 2, 3, 4, 5, 6, 7, 8, 9.' defined by the voice pre-processing technology.

'The number is' is searched as a keyword from the received voice by the keyword spotting algorithm (S110). The phrase 'The number is' is searched again as a keyword from the detected voice spoken after the searched 'The number is' by the keyword spotting algorithm (S120). Voice signals between 'The number is' and 'The number is' searched by the keyword spotting algorithm are stored in the buffer (S130). The voice signals include number information indicating the telephone number. Thereafter, in this embodiment, the number information is recognized by a connected word recognition algorithm such as Dynamic Time Warping (DTW). The feature vector sequence of 0, 1, 2, 3, 4, 5, 6, 7, 8, 9 is used as the reference pattern (S140).

The telephone number retrieval system as disclosed herein, unlike prior art systems, provides for monitors changing characteristics of the received voice. The herein disclosed telephone number retrieval system monitors variables such as time duration of the received voice, length of designated words between numbers of the telephone number, and location of numbers according to a time axis compared with a vector reference pattern.

In contrast, if these variables are not monitored and accounted for, these variables may cause errors or number recognition failures. Software algorithms such as DTW, utilizing a time axis nonlinear elastic matching method based on dynamic programming (DP) from Vintsynk, Chiba and Sakoe, can efficiently process these received voice time length variations.

After the numbers are recognized, the recognition result is displayed on the display of the terminal or stored in the phonebook of the terminal (S150), so that the user can call to the telephone number anytime.

As discussed earlier, the method for displaying and storing the automatic response telephone number precisely recognizes and searches the telephone number from the voice of the ARS with small calculations, by using the keyword spotting algorithm and the connected word recognition algorithm, and displays the telephone number on the display of the terminal or stores the telephone number in the phonebook of the terminal, so that the user can conveniently use the telephone number.

In addition, once the user calls the telephone number service, he/she does not have to call the telephone number service again or search a telephone number note. It makes the user feel very comfortable that the user can call anytime to the telephone number stored in the terminal. It is also economically advantageous.

While the invention has been shown and described with reference to certain preferred embodiments thereof, it will be understood by those skilled in the art that various changes in form and details may be made therein. For example, the present invention can be applied when the connected words are recognized by Hidden Markov Model (HMM), Vector Quantization (VQ) or Neural Network (NN) as well as the DTW. Furthermore, if the mechanical voice or the response type of the ARS is changed by the telephone number service, it can be handled by downloading the changed contents. Furthermore, the above methods, as described below, are applicable to any mobile communication device and/or a base station terminal.

Figure 5:
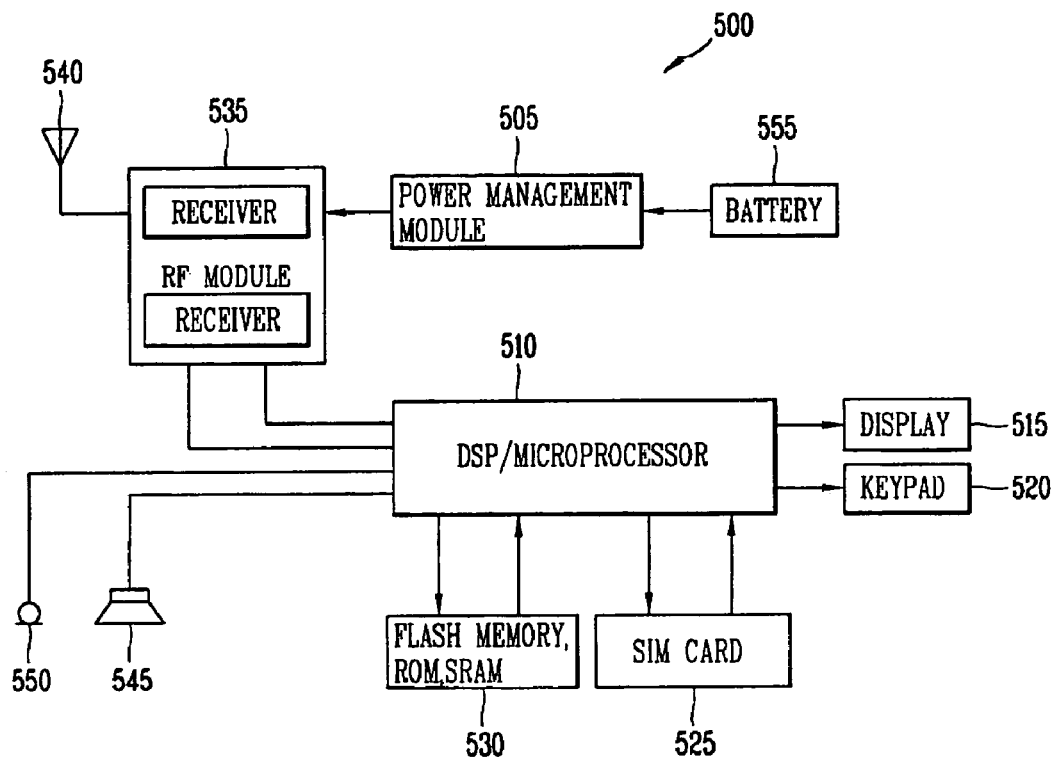
FIG. 5 is a block diagram illustrating a mobile communication device in accordance with an embodiment of the invention.

Referring to FIG. 5, a block diagram of a mobile communication device 500 of the present invention such as a mobile phone for performing the methods of the present invention. The mobile communication device 500 includes a processing unit 510 such as a microprocessor or digital signal processor, an RF module 535, a power management module 505, an antenna 540, a battery 555, a display 515, a keypad 520, a storage unit 530 such as flash memory, ROM or SRAM, a speaker 545 and a microphone 550.

A user enters instructional information, such as a telephone number, for example, by pushing the buttons of a keypad 520 or by voice activation using the microphone 550. The processing unit 510 receives and processes the instructional information to perform the appropriate function, such as dialing a telephone number. Operational data may be retrieved from the storage unit 530 to perform the function. Furthermore, the processing unit 510 may display the instructional and operational information on the display 515 for the user's reference and convenience.

The processing unit 510 issues instructional information to the RF module 535, to initiate communication, for example, transmit radio signals comprising voice communication data. The RF module 535 comprises a receiver and a transmitter to receive and transmit radio signals. The antenna 540 facilitates the transmission and reception of radio signals. Upon receive radio signals, the RF module 535 may forward and convert the signals to baseband frequency for processing by the processing unit 510. The processed signals would be transformed into audible or readable information outputted via the speaker 545.

The processing unit 510 is adapted to perform the methods illustrated above in FIGS. 3-4. As an example, the processing unit 510 is adapted to accessing a telephone number service and receiving a voice response from the telephone number service including a telephone number portion. The processing unit searches for at least one designated word of the telephone number service within the voice response according to a keyword spotting routine. Numbers between the designated words are extracted and stored in a buffer. A number recognizer reads contents of the buffer and processes a recognized telephone number from the buffer. The recognized telephone numbers is transferred to a display, such as a mobile terminal, for viewing by a user and/or to a memory location, such as a telephone book on the mobile terminal, for future use. Other features, as described above in FIGS. 3 and 4, may be incorporated as well into the processing unit 510.

The processing unit 510 stores the messages received from and messages transmitted to other users in the storage unit 530, receive a conditional request for message input by the user, process the conditional request to read data corresponding to the conditional request from the storage unit. The processing unit 510 outputs the message data to the display unit 515. The storage unit 530 is adapted to store message data of the messages both received and transmitted.

Figure 6:
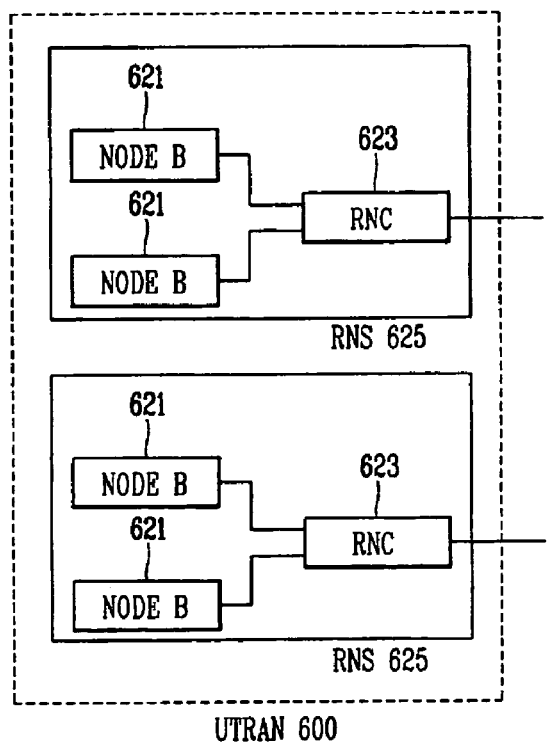
FIG. 6 is a block diagram illustrating a UTRAN in accordance with an embodiment of the invention.

FIG. 6 illustrates a block diagram of a UTRAN 600 according to the preferred embodiment of the present invention. The UTRAN 600 includes one or more radio network sub-systems (RNS) 625. Each RNS 625 includes a radio network controller (RNC) 623 and a plurality of Node-Bs (base stations) 621 managed by the RNC. The RNC 623 handles the assignment and management of radio resources and operates as an access point with respect to the core network. Furthermore, the RNC 623 is adapted to perform the methods of the present invention.

The Node-Bs 621 receive information sent by the physical layer of the terminal through an uplink, and transmit data to the terminal through a downlink. The Node-Bs 621 operate as access points, or as a transmitter and receiver, of the UTRAN 600 for the terminal. It will be apparent to one skilled in the art that the mobile communication device 500 may be readily implemented using, for example, the processing unit 510 (of FIG. 5) or other data or digital processing device, either alone or in combination with external support logic.

By utilizing the present invention, the user of a mobile communication device may store multimedia data as described above in FIGS. 3-4. As an example, the controller 610 is adapted to accessing a telephone number service and receiving a voice response from the telephone number service including a telephone number portion. The controller unit searches for at least one designated word of the telephone number service within the voice response according to a keyword spotting routine. Numbers of the telephone number are extracted and stored between the designated words in a buffer. A number recognizer reads and processes contents of the buffer creating a recognized telephone number. The recognized telephone number is transferred to a display for viewing by a user and/or to a memory location for future use.

It will be apparent to one skilled in the art that the preferred embodiments of the present invention can be readily implemented using, for example, the processing unit 510 (of FIG. 5) or other data or digital processing device, either alone or in combination with external support logic.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. Accordingly, the invention is not limited to the precise embodiments described in detail hereinabove.

With respect to the claims, it is applicant's intention that the claims not be interpreted in accordance with the sixth paragraph of 35 U.S.C. section 112 unless the term "means" is used followed by a functional statement.

In the claims, means-plus-function clauses are intended to cover the structure described herein as performing the recited function and not only structural equivalents but also equivalent structures. Further, with respect to the claims, it should be understood that any of the claims described below may be combined for the purposes of the invention.

What is claimed is:

1. In a mobile communication device, a method for displaying a recognized telephone number and storing the recognized telephone number in a buffer, the method comprising the steps of:

accessing a telephone number service;

receiving a voice response from the telephone number service, the voice response including a telephone number portion;

searching for a first and a second designated word within the voice response according to a keyword spotting routine;

parsing the telephone number portion between the first and the second designated words;

extracting the recognized telephone number from the parsed portion using a number recognizer;

displaying the recognized telephone number on a display; and storing the recognized telephone number in memory.

2. The method of claim 1, wherein the telephone number service is an Automatic Response System.

3. The method of claim 1, wherein the telephone number service has a voice type or a response type that has been changed and a terminal downloads a parameter file to maintain high performance of the telephone service.

4. The method of claim 1, further comprising the steps of:

providing by a service provider to a user information that the telephone number service has a format change and how to download the changed contents; and charging a fee in the form of a business model.

5. The method of claim 1, further comprising the step of:
downloading of a reference pattern or a parameter file by the terminal through a personal computer upon receiving information from Internet.

6. The method of claim 2, further comprising the step of: downloading a reference pattern on a wireless Internet directly by the terminal.

7. The method of claim 1, further comprising the step of: listening by a user for the telephone number from at least one of a voice of a telephone operator and a speaker-dependent mechanical voice of an Automatic Response System.

8. The method of claim 1, wherein the designated words includes at least one specific word before and after the number portion of the telephone number.

9. The method of claim 1, wherein the recognized telephone number from the voice signals is recognized by a word recognition algorithm.

10. The method of claim 9, wherein the word recognition algorithm is a Dynamic Time Warping (DTW) algorithm.

11. The method of claim 10, wherein the DTW algorithm uses a feature vector sequence of 0 to 9 as a reference pattern.

12. The method of claim 9, wherein the word recognition algorithm is a Hidden Markov Model (HMM) algorithm.

13. The method of claim 9, wherein the word recognition algorithm is a Vector Quantization (VQ) algorithm.

14. The method of claim 9, wherein the word recognition algorithm is a Neural Network (NN) algorithm.

15. The method of claim 1, further comprising the step of: defining feature vectors as a sequence produced by voice pre-processing technology upon completion of the keyword spotting routine.

16. The method of claim 15, further comprising the step of:
storing the defined feature vectors in the memory of the terminal.

17. The method of claim 15, wherein the voice pre-processing technology utilizes Linear Predictive Cepstral Coefficients for extracting characteristics of the voice response.

18. The method of claim 15, wherein the voice pre-processing technology utilizes Perceptual Linear Prediction for extracting characteristics of the voice response.

19. The method of claim 1, wherein the voice response utilizes a voice pre-processing technology including Mel-Frequency Cepstral Coefficients (MFCC) for extracting characteristics of the voice response.

20. A method for a mobile communication terminal to store a specific reference feature vector sequence in memory associated with a telephone number comprising:
searching a terminal accessing a telephone number service for at least one of a voice of a telephone operator and mechanical voice of an Automatic Response System (ARS);
searching for a first specified word and a second specified word in the at least one of the voice of the telephone operator and the mechanical voice of the Automatic Response System, utilizing a keyword spotting routine;
storing a voice response between the first specified word and the second specified word searched in a buffer;
applying a word recognition algorithm to the voice response stored in the buffer;
recognizing a telephone number from the contents of the buffer, and
displaying the recognized telephone number on a display and storing the telephone number in a phonebook of the terminal.

21. The method of claim 20, further comprising the steps of:
defining feature vectors as a sequence according to a voice pre-processing technology, and
applying the keyword spotting routine using specific reference vector obtained from the defined feature vectors.

22. The method of claim 21, wherein the voice pre-processing technology utilizes Mel-Frequency Cepstral Coefficients for extracting characteristics of voice.

23. The method of claim 21, wherein the voice pre-processing technology utilizes Linear Predictive Cepstral Coefficients for extracting characteristics of voice.

24. The method of claim 21, wherein the voice pre-processing technology utilizes Perceptual Linear Prediction for extracting characteristics of voice.

25. The method of claim 21, wherein the keyword spotting routine uses a feature vector sequence of 'The number is' as a reference pattern.

26. The method of claim 21, wherein the word recognition algorithm is a Dynamic Time Warping algorithm.

27. The method of claim 26, wherein the Dynamic Time Warping algorithm uses a feature vector sequence of '0, 1, 2, 3, 4, 5, 6, 7, 8, 9' as a reference pattern.

28. The method of claim 20, wherein the word recognition algorithm is a Hidden Markov Model algorithm.

29. The method of claim 20, wherein the word recognition algorithm is a Vector Quantization algorithm.

30. The method of claim 20, wherein the word recognition algorithm is a Neural Network algorithm.

31. A mobile communication device for managing messages communicated in a mobile communication system, the mobile communication device comprising:
an RE module comprising a transmitter and a receiver communicating messages in a mobile communication system;
means for accessing a telephone number service;
means for receiving a voice response from the telephone number service including a telephone number portion;
means for searching for a first and a second designated word within the voice response according to a keyword spotting routine;
means for parsing the telephone number portion between the first and the second designated words;
means for extracting a recognized telephone number from the parsed portion using a number recognizer;
a display unit for displaying the recognized telephone number; and
means for storing the recognized telephone number in memory.

32. The device of claim 31, wherein the telephone number service is an Automatic Response System.

33. The device of claim 31, wherein the telephone number service has a voice type or a response type that has been changed and a terminal downloads a parameter file to maintain high performance of the telephone service.

34. The device of claim 31, wherein the telephone number service has a format change and a service provider informs the user how to download the changed contents, and charges a fee in the form of a business model.

* * * * *